United States Patent
Takayanagi

(10) Patent No.: US 10,848,673 B2
(45) Date of Patent: Nov. 24, 2020

(54) IMAGE STABILIZATION CONTROL APPARATUS, IMAGE CAPTURING SYSTEM, CONTROL METHOD, AND RECORDING MEDIUM

(71) Applicant: CANON KABUSHIKI KAISHA, Tokyo (JP)

(72) Inventor: Wataru Takayanagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 16/245,377

(22) Filed: Jan. 11, 2019

(65) Prior Publication Data

US 2019/0222763 A1 Jul. 18, 2019

(30) Foreign Application Priority Data

Jan. 12, 2018 (JP) .................. 2018-003722

(51) Int. Cl.
*H04N 5/232* (2006.01)
*H04N 5/235* (2006.01)
*G06F 9/30* (2018.01)

(52) U.S. Cl.
CPC ....... *H04N 5/23267* (2013.01); *G06F 9/3004* (2013.01); *H04N 5/2353* (2013.01); *H04N 5/23209* (2013.01); *H04N 5/23238* (2013.01); *H04N 5/23258* (2013.01); *H04N 5/23287* (2013.01)

(58) Field of Classification Search
CPC .................................................. H04N 5/23267
USPC ........................................................ 348/208.6
See application file for complete search history.

(56) References Cited

U.S. PATENT DOCUMENTS

2005/0140793 A1* 6/2005 Kojima .............. H04N 5/23248
348/208.99

FOREIGN PATENT DOCUMENTS

JP 2015-194711 A 11/2015

* cited by examiner

*Primary Examiner* — Joel W Fosselman
(74) *Attorney, Agent, or Firm* — Cowan, Liebowitz & Latman, P.C.

(57) ABSTRACT

An image stabilization control apparatus that causes a first correction unit included in a first device and a second correction unit included in a second device that is able to communicate with the first device, to cooperate with each other so as to correct, when image capturing is performed, an influence of shake of these device on image capturing. The apparatus acquires information regarding a shake and a focal length related to the image capturing and assigns a correction task, which is the task of performing correction regarding an influence of shake, to the first correction unit and the second correction unit, based on the information regarding the acquired focal length. The apparatus assigns the correction task to only one of the first correction unit and the second correction unit when the focal length satisfies a predetermined condition.

13 Claims, 8 Drawing Sheets

F I G. 5A
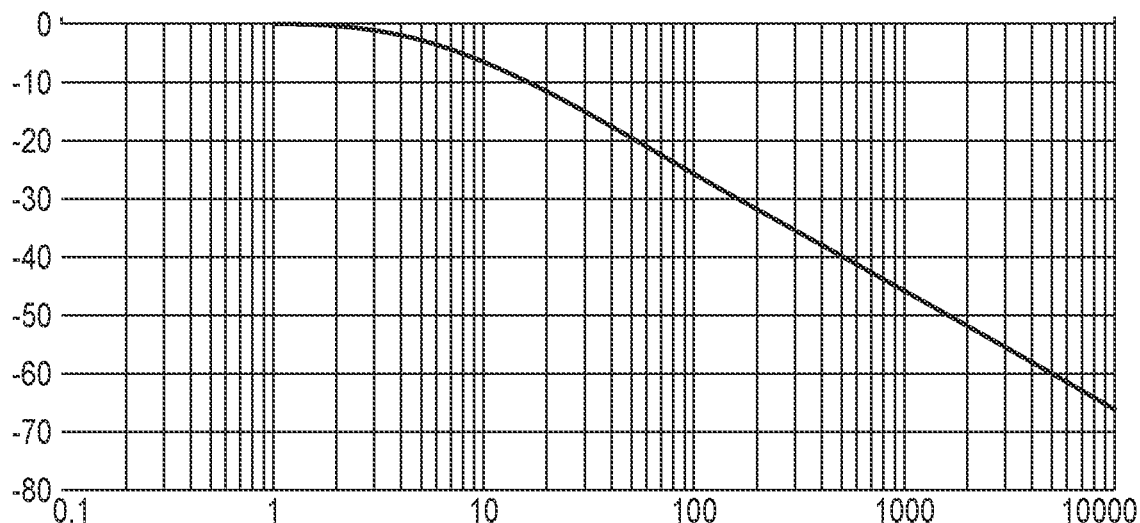
LPF RELATED TO SEPARATION FREQUENCY FROM 5 Hz
F I G. 5B
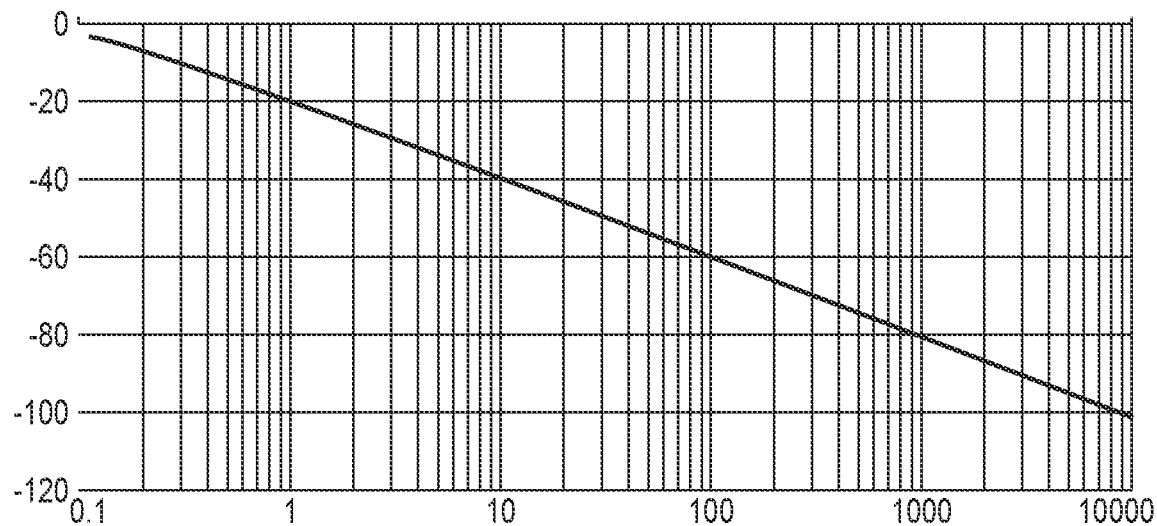
LPF RELATED TO SEPARATION FREQUENCY FROM 0.1 Hz

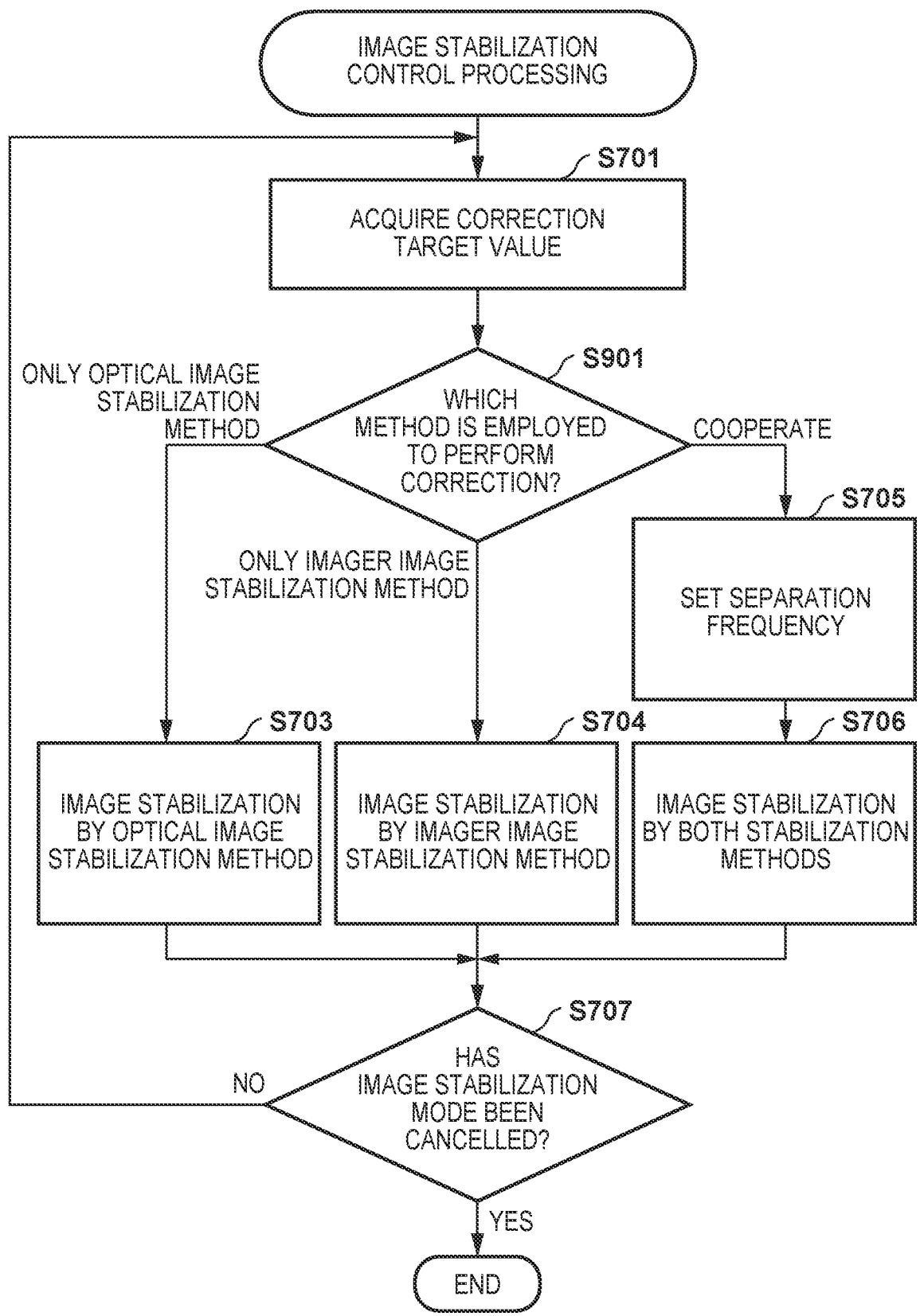

IMAGE STABILIZATION CONTROL APPARATUS, IMAGE CAPTURING SYSTEM, CONTROL METHOD, AND RECORDING MEDIUM

BACKGROUND OF THE INVENTION

Field of the Invention

The present invention relates to an image stabilization control apparatus, an image capturing system, a control method, and a recording medium, and particularly to technology for performing correction regarding an influence of shake of an image capturing apparatus, using a plurality of types of methods.

Description of the Related Art

Image capturing apparatuses in recent years, such as digital cameras and video cameras, are equipped with the function of performing correction regarding an influence of shake of the apparatuses, on captured images. Using this function, the apparatuses can provide captured images with fine quality.

There are various methods for detecting shake of an image capturing apparatus and performing correction regarding an influence of the shake (an image blur), and such methods are each realized using a different mechanism. For example, there is an optical image stabilization method, which is for performing optical correction by driving an image stabilization lens mechanism provided in an image optical system to reduce an image blur (displacement of an optical image formed on an image sensor) caused by shake. Also, for example, there is an imager image stabilization method, which is for performing mechanical correction by changing the position and rotation of the image sensor itself, to reduce displacement and rotation, caused by shake, of an optical image of the subject formed on the image sensor.

Some image capturing apparatuses employ both the optical image stabilization method and the imager image stabilization method described above to realize image blur correction with consideration given to characteristics of each method (Japanese Patent Laid-Open No. 2015-194711).

In the image capturing apparatus disclosed in Japanese Patent Laid-Open No. 2015-194711, a correction lens for performing correction through the optical image stabilization method and an image sensor for performing correction through the imager image stabilization method are separately provided in an interchangeable lens and a camera body, and components of shake are separately corrected by them based on frequency bands of the detected shake. More specifically, in the image capturing apparatus disclosed in Japanese Patent Laid-Open No. 2015-194711, image stabilization is realized by separating shake into shape components so that a component of shake classified as a low-frequency band component of the detected shake is subjected to imager image stabilization, and a component of shake classified as a high-frequency band component of the detected shake is subjected to optical image stabilization.

If image stabilization is realized by using two devices cooperating with each other in such a manner, shake is separated into components based on frequency bands of the shake, and each of the devices is required to transmit information regarding a component of shake thus separated, to the other device that performs correction using the other image stabilization method, through inter-device communication. However, if correction is performed through such inter-device communication, down sampling may occur due to a communication delay or a difference between the periods of control cycles, and image stabilization that is to be performed at the destination of communication may cause a lag in phase, behind image stabilization performed at the origin of communication. That is, when image stabilization is performed using a plurality of devices cooperating with each other via communication, it may be impossible to achieve a favorable result of correction, due to a phase lag resulting from communication.

SUMMARY OF THE INVENTION

The present invention was made in view of such problems in the conventional technique. The present invention provides an image stabilization control apparatus, an image capturing system, a control method, and a recording medium that realize favorable image stabilization performance in an image capturing system that is provided with a plurality of image stabilization functions achieved using different methods.

The present invention in its first aspect provides an image stabilization control apparatus that causes a first correction unit included in a first device and a second correction unit included in a second device that is configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the image stabilization control apparatus comprising a processor; and a memory including instructions that, when executed by the processor, cause the processor to function as: an acquisition unit configured to acquire information regarding the shake and a focal length related to the image capturing; and a control unit configured to assign a correction task, which is the task of performing correction regarding the influence of shake, to the first correction unit and the second correction unit, based on the information regarding the focal length acquired by the acquisition unit, wherein the control unit assigns the correction task to only one of the first correction unit and the second correction unit when the focal length satisfies a predetermined condition.

The present invention in its second aspect provides an image capturing system that causes a first correction unit included in a first device and a second correction unit included in a second device and connected to the first device, to cooperate with each other so as to correct, when image capturing is performed, an influence of shake of the first device and the second device on image capturing, the second correction unit employing an image stabilization method that is different from an image stabilization method employed by the first correction unit, the first device comprising: a detection unit configured to detect shake of the first device when the image capturing is performed; an acquisition unit configured to acquire information regarding a focal length related to the image capturing; the first correction unit; a control unit configured to assign a correction task, which is the task of performing correction regarding the influence of shake, to the first correction unit and the second correction unit, based on the information regarding the focal length acquired by the acquisition unit; and a transmitting unit configured to transmit, to the second device, information regarding the shake for which the correction task is to be assigned to the second correction unit, the second device comprising: a receiving unit configured to receive information transmitted by the transmitting unit; and the second correction unit, and the control unit assigns the correction task to only one of the first correction unit and the second correction unit when the focal length satisfies a predetermined condition.

The present invention in its third aspect provides a method for controlling an image stabilization control apparatus that causes a first correction unit included in a first device and a second correction unit included in a second device that is configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the method comprising: an acquisition step of acquiring information regarding the shake and a focal length related to the image capturing; and a control step of assigning the correction task, to the first correction unit and the second correction unit, based on the information regarding the focal length acquired in the acquisition step, wherein, in the control step, correction is assigned to only one of the first correction unit and the second correction unit when the focal length satisfies a predetermined condition.

The present invention in its fourth aspect provides a computer-readable recording medium having recorded thereon a program for a computer that causes a first correction unit included in a first device and a second correction unit included in a second device configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the program causing the computer to execute: processing to acquire information regarding the shake and a focal length related to the image capturing; and processing to assign a correction task, which is the task of performing correction regarding the influence of shake, to the first correction unit and the second correction unit, based on the information regarding the focal length acquired in the processing executed to acquire the information, wherein, in the processing executed to perform control, the correction task is assigned to only one of the first correction unit and the second correction unit when the focal length satisfies a predetermined condition.

Further features of the present invention will become apparent from the following description of exemplary embodiments with reference to the attached drawings.

BRIEF DESCRIPTION OF THE DRAWINGS

FIGS. 5A and 5B are diagrams illustrating separation frequency control performed in a cooperation control computation unit according to an embodiment of the present invention.

FIG. 9 is a flowchart illustrating image stabilization control processing that is executed in the image capturing system according to the second embodiment of the present invention.

DESCRIPTION OF THE EMBODIMENTS

First Embodiment

The following describes illustrative embodiments of the present invention in detail with reference to the drawings. Note that the embodiment described below is an example in which the present invention is applied to an image capturing system capable of detecting shake that has occurred, and reducing an influence of the shake on a captured image by performing two types of correction, which is an example of an image capturing system provided with an image stabilization control apparatus. The image capturing system includes a camera body configured as an interchangeable lens camera body and a lens device that is configured to be able to be attached to the camera body and communicate therewith, which respectively have correction functions using different correction methods. The image stabilization control apparatus may be provided in either device. The present invention is applicable to any device that is capable of detecting shake of an image capturing apparatus, and reducing an influence of the shake on a captured image by performing a plurality of types of correction in a plurality of different devices.

Configuration of Image Capturing System

Figure 1:
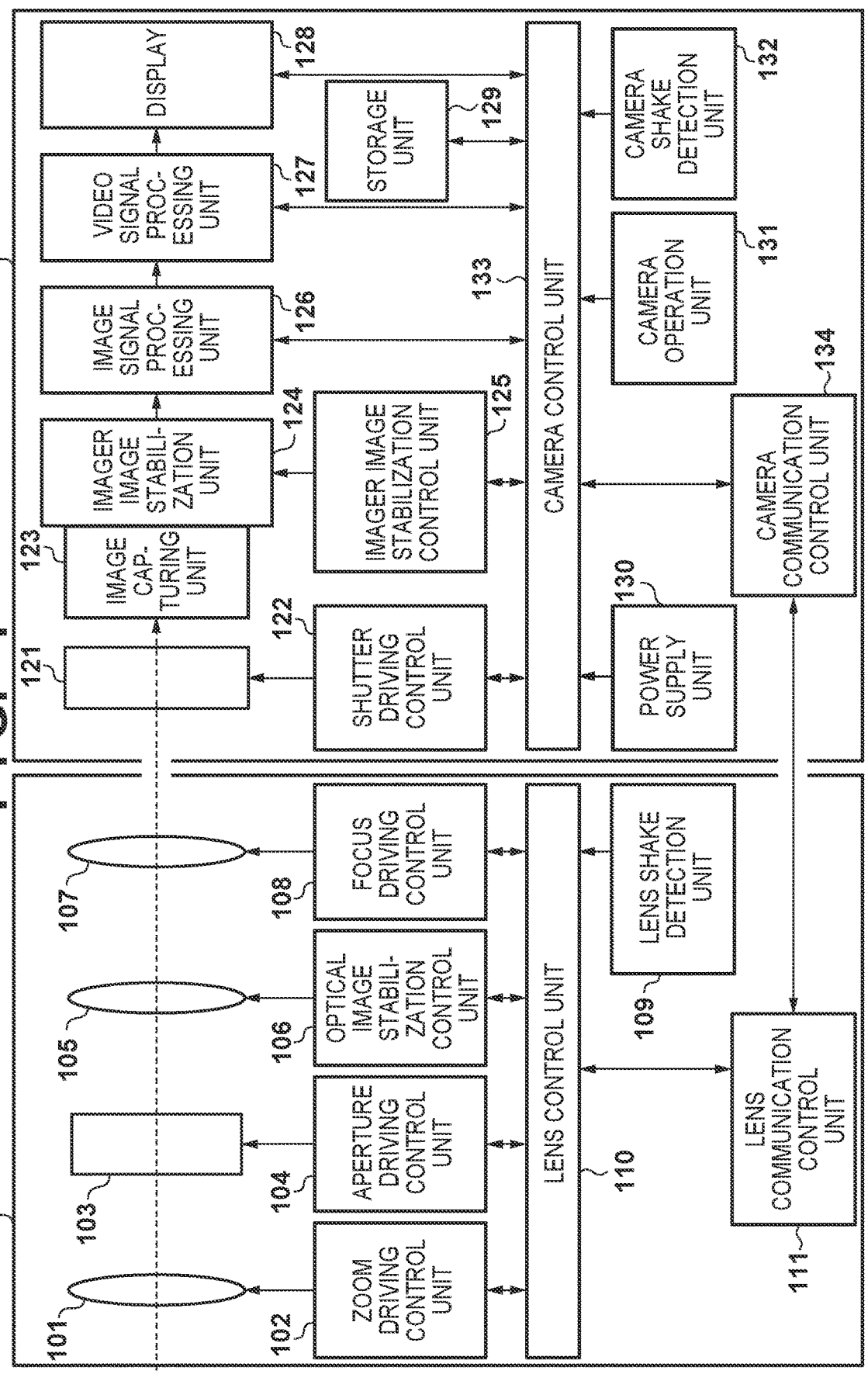
FIG. 1 is a block diagram illustrating a functional configuration of an image capturing system according to an embodiment of the present invention.

FIG. 1 is a block diagram showing a functional configuration of an image capturing system according to an embodiment of the present invention. In the present embodiment, the image capturing system is an interchangeable lens digital camera, and is capable of performing still image shooting and moving image shooting.

Configuration of Lens Device 100

A zoom unit 101 is a lens unit that includes a zoom lens that changes the focal length, which is one of several image capturing settings, a driving mechanism for the zoom lens, a position detection sensor, and so on. As a result of the zoom lens in the zoom unit 101 being moved in the optical axis direction, the focal length changes, and thus an optical image formed on the image sensor of an image capturing unit 123 described below changes. Driving control for the zoom unit 101 is performed by a zoom driving control unit 102. The zoom driving control unit 102 performs driving control on the zoom lens, and is therefore configured to be able to detect the position of the zoom lens (the zoom position) on the optical axis.

An aperture unit 103 is an aperture, and adjust the amount of light entering the image capturing unit 123 via a lens device 100. Driving control related to the size of the opening of the aperture unit 103 is performed by an aperture driving control unit 104.

An image stabilization unit 105 is a component for performing correction regarding an influence of shake on a captured image (an image blur) caused by shake of the lens device 100 or a camera body 120 in the image capturing system according to the present embodiment. The image stabilization unit 105 includes an image stabilization lens (a shift lens) for correcting displacement, caused by shake, of the position at which an optical image of the subject is formed on the image sensor, a driving mechanism for the shift lens, a position detection sensor, and so on. The shift lens in the image stabilization unit 105 is moved in a direction orthogonal to the optical axis, and thus an image blur is corrected such that the position at which an optical image related to the subject is formed is maintained. The direction in which the shift lens is moved is not specifically limited, and need only include a directional component orthogonal to the optical axis. Driving control for the image stabilization unit 105 is performed by an optical image stabilization control unit 106. More specifically, the optical image stabilization control unit 106 performs driving control by transmitting information (a drive signal) regarding a driving amount that has been determined in relation to correction, to the image stabilization unit 105. In the present embodiment, the image stabilization unit 105 and the optical image stabilization control unit 106 realize OIS, which is optical correction of an image blur, as a correction means (the first correction means or the second correction means) according to the present invention. Note that "OIS" is an abbreviation of Optical Image Stabilization.

A focus unit 107 is a lens unit that includes a focus lens that performs focal point adjustment, a driving mechanism for the focus lens, a position detection sensor, and so on. As a result of the focus lens in the focus unit 107 being moved in the optical axis direction, the focal state of an optical image formed on the image sensor changes. Driving control for the focus unit 107 is performed by a focus driving control unit 108.

Note that the image optical system includes the zoom unit 101, the aperture unit 103, the image stabilization unit 105, and the focus unit 107, and reflection light from the subject enters the camera body 120 via the image optical system.

A lens shake detection unit 109 in the image capturing system according to the present embodiment is a component for detecting shake of the lens device 100. The lens shake detection unit 109 may include a gyro sensor and an acceleration sensor, and detects an angular velocity in each of the rotational directions (pitch, yaw, and roll directions) using the former, and detects translational acceleration in each of the three axial directions using the latter.

A lens control unit 110 performs overall control on operations of the blocks of the lens device 100, in particular, on image stabilization operations. In the present embodiment, the zoom driving control unit 102, the aperture driving control unit 104, the optical image stabilization control unit 106, and the focus driving control unit 108 are described as components that are separate from the lens control unit 110. However, these components may be realized as the lens control unit 110. The lens control unit 110 can perform communication when the lens device 100 and the camera body 120 are electrically connected to each other via a contact point (not shown), and transmits/receives information to/from a camera communication control unit 134 of the camera body 120 via a lens communication control unit 111.

Configuration of Camera Body 120

A shutter unit 121 controls the amount of exposure of the image sensor by opening and closing. Driving control for the shutter unit 121 is performed by a shutter driving control unit 122.

The image capturing unit 123 includes an image sensor such as a CCD or CMOS sensor, for example, and performs photoelectric conversion on an optical image that is formed on the imaging surface of the sensor by the image optical system, and thus outputs an analogue image signal (an electrical signal) related to the captured image. Note that it is possible to change imaging sensitivity by, for example, changing sensitivity in detecting signal charge accumulated in the image sensor, or changing the amplification gain of an amplifier circuit (not shown), under the control of a camera control unit 133.

The image sensor included in the image capturing unit 123 according to the present embodiment is configured to be able to be driven by an imager image stabilization unit 124. In the image capturing system according to the present embodiment, the imager image stabilization unit 124 is another component for correcting an image blur caused by the lens device 100 or the camera body 120. The imager image stabilization unit 124 performs image stabilization by translating and rotating the image sensor in one plane that is orthogonal to the optical axis in response to shake that has occurred so that an image of the subject is formed at a fixed position on the imaging surface of the image sensor. That is, the imager image stabilization unit 124 performs image stabilization by changing at least one of the position and the posture of the image sensor (such as a rotational position in the optical axis direction). The imager image stabilization unit 124 uses an imager image stabilization control unit 125 to control the driving of the image sensor. More specifically, the imager image stabilization control unit 125 performs driving control by transmitting information (a drive signal) regarding a driving amount that has been determined in relation to correction, to the imager image stabilization unit 124. In the present embodiment, the imager image stabilization unit 124 and the imager image stabilization control unit 125 realize IIS, which is correction of an image blur performed by driving an imaging surface, as a correction means (a correction means other than the lens device 100) according to the present invention. Note that "IIS" is an abbreviation of Imager Image Stabilization.

An image signal processing unit 126 performs processing such as A/D conversion processing and development processing, to convert electrical signals output from the image capturing unit 123 to video signals. Also, video signals resulting from the conversion performed by the image signal processing unit 126 are processed by a video signal processing unit 127 according to the purpose. A display unit 128 is a display device such as an LCD, for example, and displays an image as appropriate, based on signals (output signals) output from the video signal processing unit 127. The display unit 128 performs through-the-lens display of signals that have been output as a result of image capturing, and thus functions as an electronic viewfinder.

A power supply unit 130 supplies power required by each block of the camera body 120 and the lens device 100 to operate. A camera shake detection unit 132 in the image capturing system according to the present embodiment is a component for detecting shake of the camera body 120. As with the lens shake detection unit 109, for example, the camera shake detection unit 132 may include a gyro sensor and an acceleration sensor.

The camera control unit 133 is a microcomputer, for example, and controls operations of each block of the camera body 120. Specifically, the camera control unit 133 reads out operation programs for the blocks, which are stored in a storage unit 129, for example, and loads the programs to a memory (not shown) and executes the programs to control operations of the blocks. Here, the storage unit 129 is a non-volatile memory, for example, and stores parameters and so on that are required for the blocks to operate, in addition to the operation programs for the blocks. The storage unit 129 may also be configured to store output signals (video information) and various kinds of data related to operations of the image capturing system. In the present embodiment, the shutter driving control unit 122 and the imager image stabilization control unit 125 are components that are separate from the camera control unit 133. However, these components may be realized as the camera control unit 133. As with the lens control unit 110, when the lens device 100 and the camera body 120 are electrically connected to each other via a contact point (not shown), the camera control unit 133 can transmit/receive information to/from the lens control unit 110 of the lens device 100 via the camera communication control unit 134.

A camera operation unit 131 is a user interface of the digital camera 100, including a shutter release button and a switch, for example. Upon detecting an operation input to the user interface, the camera operation unit 131 outputs a control signal corresponding to the operation, to the camera control unit 133.

In the present embodiment, the camera operation unit 131 includes an image stabilization switch with which whether or not to execute image stabilization can be selected. When an operation is performed to turn ON the image stabilization switch (to execute image stabilization), the camera control unit 133 and the lens control unit 110 control various operations related to image stabilization, including cooperation of the optical image stabilization control unit 106 and the imager image stabilization control unit 125. The operations may be performed until an operation is performed to turn OFF the switch (to not execute/stop image stabilization).

Also, for example, the camera operation unit 131 includes a shutter release button that is configured to sequentially turn ON a first switch (SW1) and then a second switch (SW2) according to the length by which the button is pressed. Upon the shutter release button being pressed by approximately half its length, the camera operation unit 131 outputs a SW1 signal indicating that the switch SW1 has been turned ON. Also, upon the shutter release button being fully pressed, the camera operation unit 131 outputs a SW2 signal indicating that the switch SW2 has been turned ON.

Upon the SW1 signal being output, the focus driving control unit 108 performs focusing by driving the focus unit 107. At the same time, the aperture driving control unit 104 and the shutter driving control unit 122 set an appropriate exposure amount by driving the aperture unit 103 and the shutter unit 121. Subsequently, upon the SW2 signal being output, image data that is based on an optical image that has undergone exposure performed by the image capturing unit 123 is stored in the storage unit 129.

Configuration related to Image Stabilization Function

Figure 2:
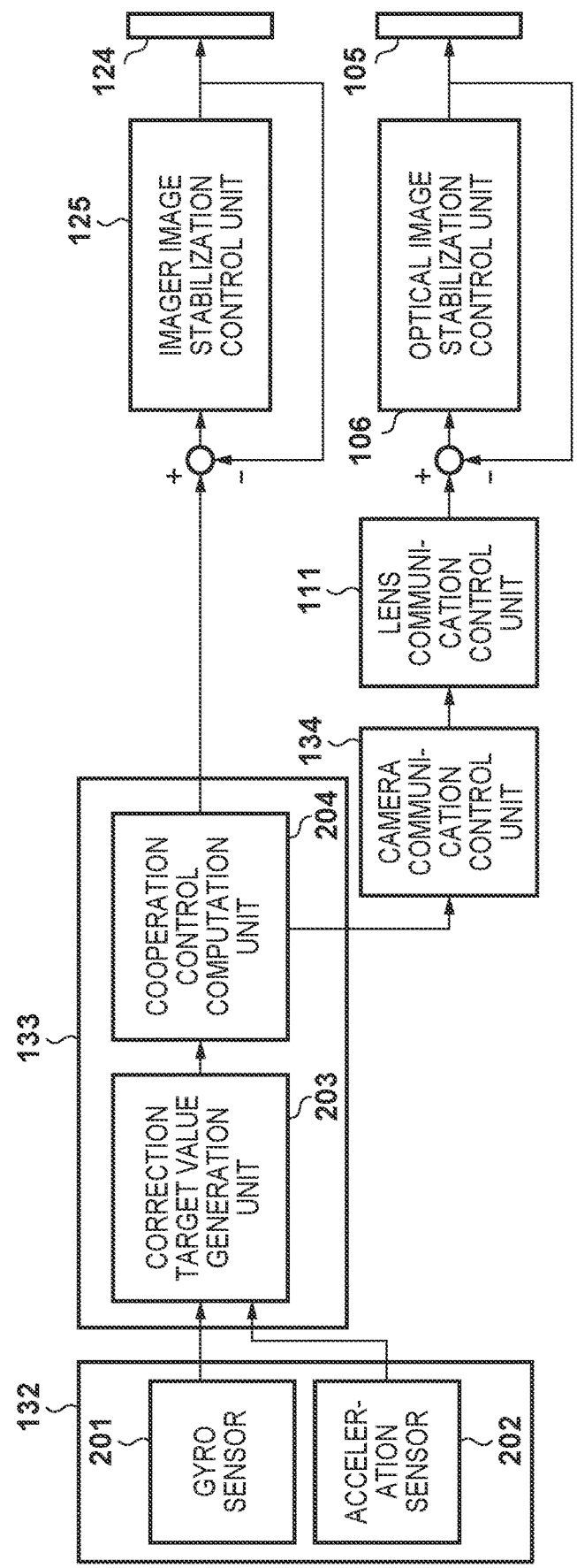
FIG. 2 is a block diagram illustrating a configuration related to image stabilization functions according to an embodiment of the present invention.

Next, the following describes a configuration related to image stabilization function realized by the image capturing system according to the present embodiment with reference to the block diagram shown in FIG. 2.

Although the example in FIG. 2 shows that various blocks related to the realization of this function are realized by the camera control unit 133, the present invention is not necessarily implemented in such a way. That is, in the image capturing system according to the present embodiment, the lens device 100 and the camera body 120 respectively include components that can perform image stabilization, and are respectively provided with control units. Therefore, it can be easily understood that either of them may perform control related to stabilization. That is, when the image stabilization function is to be realized using the image stabilization unit 105 and the imager image stabilization unit 124, it may be the camera control unit 133 or the lens control unit 110 that performs control. Therefore, in the latter case, an image stabilization control unit that needs to perform communication to transmit a correction amount related to image stabilization is the imager image stabilization unit 124, and an image stabilization control unit that does not need to perform communication is the image stabilization unit 105.

Also, when the image stabilization function is to be realized, a shake detection unit of a device that performs control is used as a gyro sensor 201 and an acceleration sensor 202 that input the amount of shake, in order to reduce the frequency of communication between the lens device 100 and the camera body 120 and accelerate correction driving. That is, in the mode described below in which the camera control unit 133 performs control, the gyro sensor 201 and the acceleration sensor 202 may be included in the camera shake detection unit 132. In the mode in which the lens control unit 110 performs control, the gyro sensor 201 and the acceleration sensor 202 may be included in the lens shake detection unit 109. However, the present invention is not necessarily implemented in such a way, and need only be implemented such that units that utilize different image stabilization methods cooperate with each other based on information regarding the amount of shake acquired by one device in the image capturing system.

Upon a shake signal related to shake of the camera body 120 being output from the gyro sensor 201 and the acceleration sensor 202 of the camera shake detection unit 132, a correction target value generation unit 203 of the camera control unit 133 derives a correction target value for the overall system based on the signal. Here, the correction target value is a correction amount (or a driving amount) that is to be applied by the overall system to correct an image blur, and includes correction information regarding various frequency bands corresponding to properties of shake.

A cooperation control computation unit 204 of the camera control unit 133 determines how the correction amount derived by the correction target value generation unit 203 is to be allocated to the image stabilization unit 105 and the imager image stabilization unit 124 when correction is to be performed. In the present embodiment, the cooperation control computation unit 204 assigns the task of performing correction regarding shake of the camera body 120 to the image stabilization unit 105 and the imager image stabilization unit 124 based on information regarding the focal length that has been set in relation to image capturing. In the present embodiment, when causing the image stabilization unit 105 and the imager image stabilization unit 124 to cooperate to correct an image blur, the cooperation control computation unit 204 separates the correction amount derived by the correction target value generation unit 203 into components according to frequency bands (details will be described later). In other words, a separation frequency that is to be used as a reference for separation has been defined, and the cooperation control computation unit 204 separates the correction amount into a correction amount that has a frequency higher than the separation frequency and a correction amount that has a frequency lower than the separation frequency, with reference to the separation frequency (a cutoff frequency). The correction mounts thus separated are transmitted to the optical image stabilization control unit 106 and the imager image stabilization control unit 125 that each perform drive control for correction corresponding thereto. In this way, by causing a unit that employs the optical image stabilization method and a unit that employs the imager image stabilization method to cooperate with each other to perform correction, it is possible to perform correction regarding a large amount of influence of shake on a captured image, compared to when only one of the units is used.

As described above, in the present embodiment, it is the camera control unit 133 that derives the correction amount related to image stabilization and performs separation. Therefore, the transmission of a correction amount to the imager image stabilization control unit 125 can be performed via an internal bus. On the other hand, the transmission of a correction amount to the optical image stabilization control unit 106 needs to be performed via the camera communication control unit 134 and the lens communication control unit 111. Therefore, that transmission is performed via these components as shown in the figure.

As described above, processing in the present embodiment is realized by circuits and processors corresponding to the blocks of the lens device 100 and the camera body 120, which are pieces of hardware. However, the present invention is not necessarily implemented in such a way, and processing performed by the blocks may be realized by a program that performs the same processing.

Correction Allocation Control

As described above, the image capturing system according to the present embodiment employs both the optical image stabilization method and the imager image stabilization method to correct (reduce) an image blur that occurs when an image is captured. More specifically, the image capturing system according to the present embodiment allocates different correction amounts (frequency bands) to the two types of correction methods respectively, according to conditions regarding an image capturing environment or image capturing settings, and thus performs shake correction.

Figure 3:
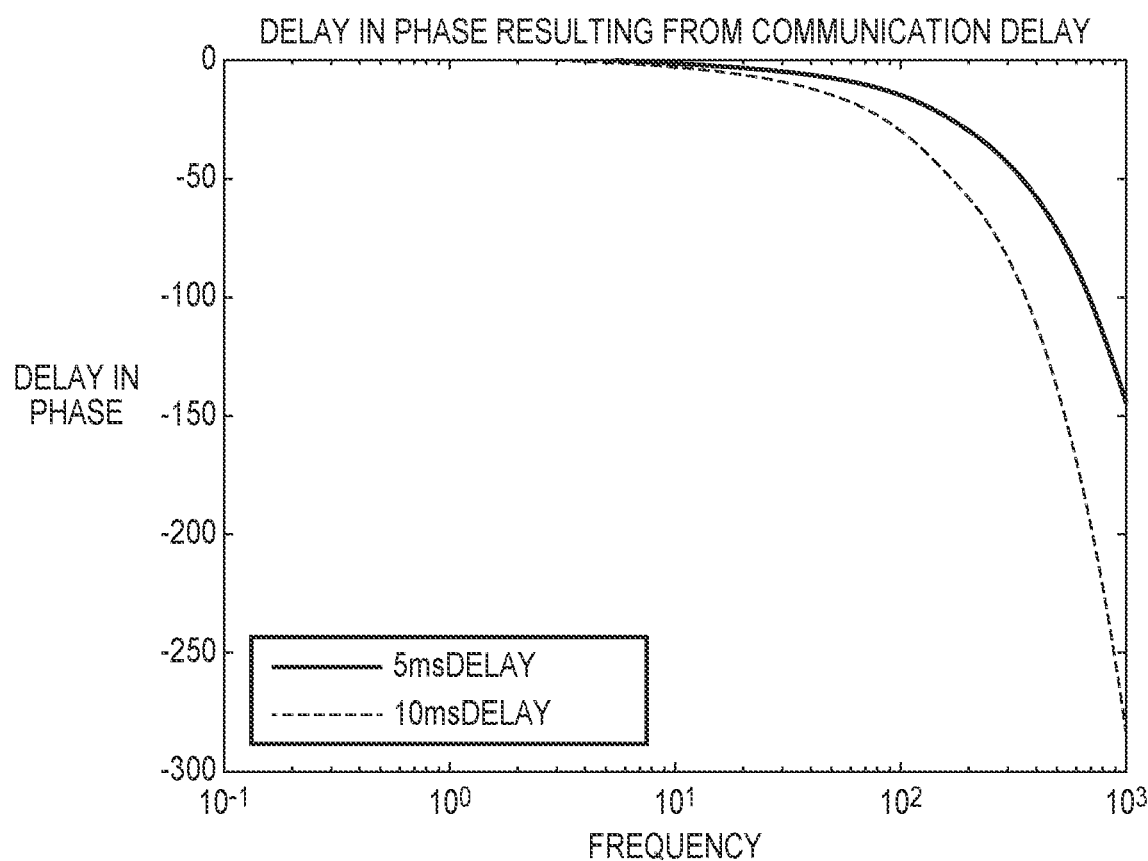
FIG. 3 is a diagram illustrating a phase lag caused by a communication delay in an image capturing system according to an embodiment of the present invention.
Figure 4:
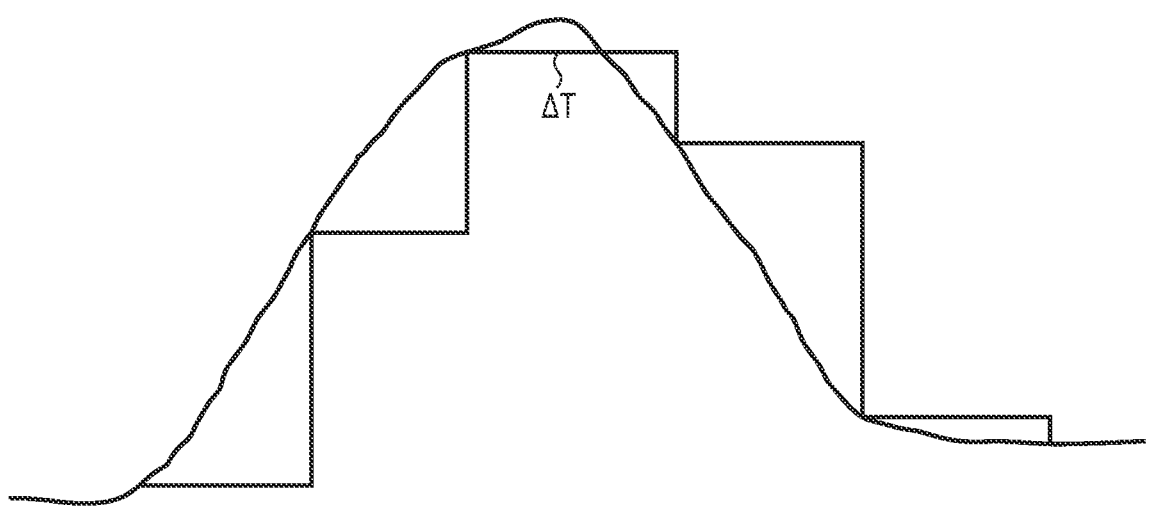
FIG. 4 is a diagram illustrating a phase lag caused by down sampling in an image capturing system according to an embodiment of the present invention.

However, when the cooperation control computation unit 204 separates the correction amount for the overall system, derived by the correction target value generation unit 203, into correction amounts, and the image stabilization unit 105 and the imager image stabilization unit 124 are caused to cooperate with each other to perform image stabilization, inter-device communication needs to be performed. When inter-device communication is performed, down sampling may occur due to a communication delay or a difference between the periods of control cycles, and image stabilization performed by the image stabilization unit 105 and image stabilization performed by the imager image stabilization unit 124 may have a phase difference. For example, as shown in FIG. 3, a delay in phase resulting from a communication delay (a delay occurring in the recipient of a correction amount (the image stabilization unit 105)) varies depending on the frequency of the correction amount. The higher the frequency band of a correction amount is, the greater the influence of the communication delay on the correction amount is and the greater the delay in phase is. Also, for example, a delay in phase due to down sampling is caused as a result of a transmitted signal being processed as a rectangular signal that has been discretely acquired, as shown in FIG. 4. The period ΔT from one input to the next input corresponds to a delay in phase. Therefore, a delay in phase resulting from a communication delay and the delay ΔT resulting from down sampling can be considered as the same delay. Such a delay θ in phase can be derived as follows according to Standard of Camera & Imaging Products Association (CIPA) DC-011-2012: Measurement and Description Method for Image Stabilization Performance of Digital Cameras:

$$G(j\omega) = e^{-j\omega\frac{\Delta T}{2}} = \cos\omega\frac{\Delta T}{2} - j\sin\omega\frac{\Delta T}{2}$$

$$|G(j\omega)| = \sqrt{\cos^2\omega\frac{\Delta T}{2} + \sin^2\omega\frac{\Delta T}{2}} = 1,$$

$$g = 29\log|G(j\omega)| = 20\log 1 = 0[dB]$$

$$\theta = \angle G(j\omega) = -\tan^{-1}\frac{\sin\omega\frac{\Delta T}{2}}{\cos\omega\frac{\Delta T}{2}} = -\omega\frac{\Delta T}{2} \times \frac{180}{\pi}[deg]$$

where the communication delay is ΔT, and $$G(s) = e^{-\frac{\Delta T}{2}s}$$

is satisfied, and j denotes an imaginary number and w denotes an angular frequency. That is, as can be seen from the above equations, the delay time does not affect the gain of control, but results in a delay in phase, which may lead to degradation in the accuracy of image stabilization (degradation in image stabilization performance (the number of stops in image stabilization)).

The optical image stabilization method and the imager image stabilization method have the following characteristics regarding how to derive a driving amount and the content of processing. When the imager image stabilization method is employed, a driving amount is computed by multiplying the focal length by the amount of shake θ, and therefore the driving amount increases as the focal length is changed toward the telephoto side. That is, in view of the limit of the driving amount of the imager image stabilization unit 124, when the focal length is on the telephoto side, the amount of shake that can be corrected by employing the imager image stabilization method is limited to a certain range. In contrast, when the focal length is on the wide-angle side, the term indicating the focal length is small, and therefore the range of the amount of shake that can be corrected is wider. On the other hand, when the optical image stabilization method is employed, the influence of the focal length on the driving amount is small compared to when the imager image stabilization method is employed. Therefore, when the focal length is on the telephoto side, the range of the amount of shake that can be corrected is wide compared to when the imager image stabilization method is employed.

Considering such differences in characteristics between the image stabilization methods, on the wide-angle side, it is possible to secure a large number of stops in image stabilization by employing only the imager image stabilization method, and on the telephoto side, it is possible to secure a large number of stops in image stabilization by employing only the optical image stabilization method. Therefore, when the focal length is on the telephoto side relative to a first threshold value, the cooperation control computation unit 204 assigns the correction task to only the image stabilization unit 105, and when the focal length is on the wide-angle side relative to a second threshold value, the cooperation control computation unit 204 assigns the correction task to only the imager image stabilization unit 124. When the focal length is in the range from the first threshold value to the second threshold value, the cooperation control computation unit 204 assigns the correction task to the image stabilization unit 105 and the imager image stabilization unit 124. That is, the range of focal lengths for which correction functions of a plurality of image stabilization methods are employed cooperatively is limited, and only one of the image stabilization method correction function is employed for some focal lengths so that the likelihood of a delay in phase occurring is reduced.

In the present embodiment, for the sake of simplification, image capturing settings other than the focal length (such as the shutter speed) are invariable. In order to prevent the user from feeling discomfort due to abrupt switching between the image stabilization methods occurring near the threshold values, the separation frequency may be adjusted for predetermined ranges near the threshold values of the focal length. For example, regarding a predetermined range of the focal length from the first threshold value to a value on the wide-angle side, the separation frequency may be adjusted such that the correction of the component in the frequency band that is to be assigned to the optical image stabilization method is widened as the focal length approaches the first threshold value, and the correction of the component in the frequency band that is to be assigned to the imager image stabilization method is widened as the focal length changes toward the wide-angle side. Similarly, regarding a predetermined range of the focal length from the second threshold value to a value on the telephoto side, the separation frequency may be adjusted such that the correction of the component in the frequency band that is to be assigned to the imager image stabilization method is widened as the focal length approaches the second threshold value, and the correction of the component in the frequency band that is to be assigned to the optical image stabilization method is widened as the focal length changes toward the telephoto side. Such an adjustment may be performed by, for example, gradually changing the filter coefficient of a low pass filter (LPF) related to the separation frequency from 5 Hz, which is shown in FIG. 5A, to 0.1 Hz, which is shown in FIG. 5B.

Figure 6:
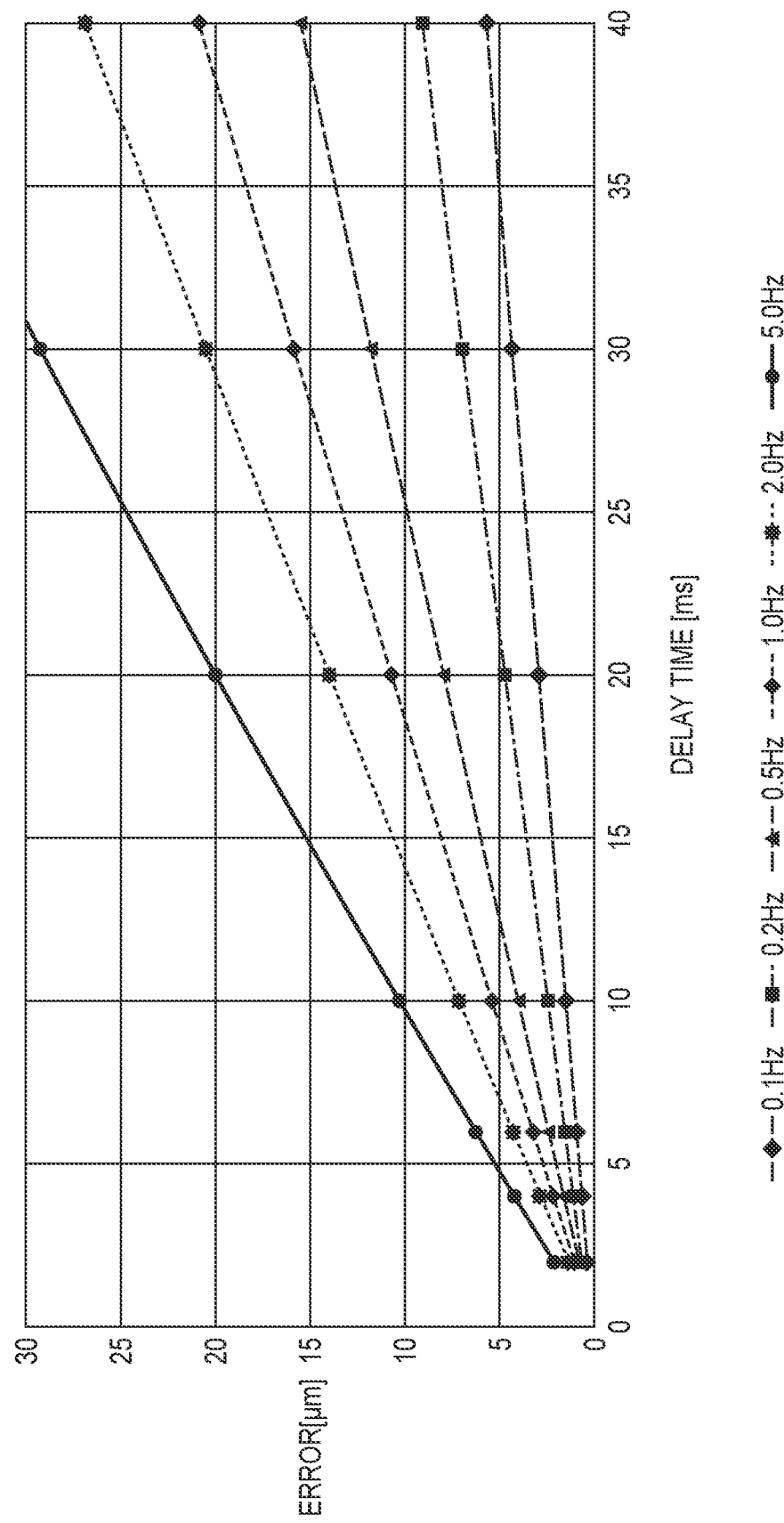
FIG. 6 is a diagram illustrating a relationship between a communication delay and a correction remainder in an image capturing system according to an embodiment of the present invention.

FIG. 6 is a graph showing a communication delay that occurs and the size of a correction remainder (an error ($\mu$m)) on the image sensor in a case where image stabilization is performed by causing the image stabilization functions according to the optical image stabilization method and the imager image stabilization method to cooperate with each other. As shown in the figure, the higher the separation frequency is, the more than correction remainder is likely to occur on the imaging surface when image stabilization is performed through the cooperation. Therefore, the separation frequency may be adjusted so as to increase as the focal length changes from a threshold value related to correction using a single method toward a value related to the cooperation, for example.

Image Stabilization Control Processing

Figure 7:
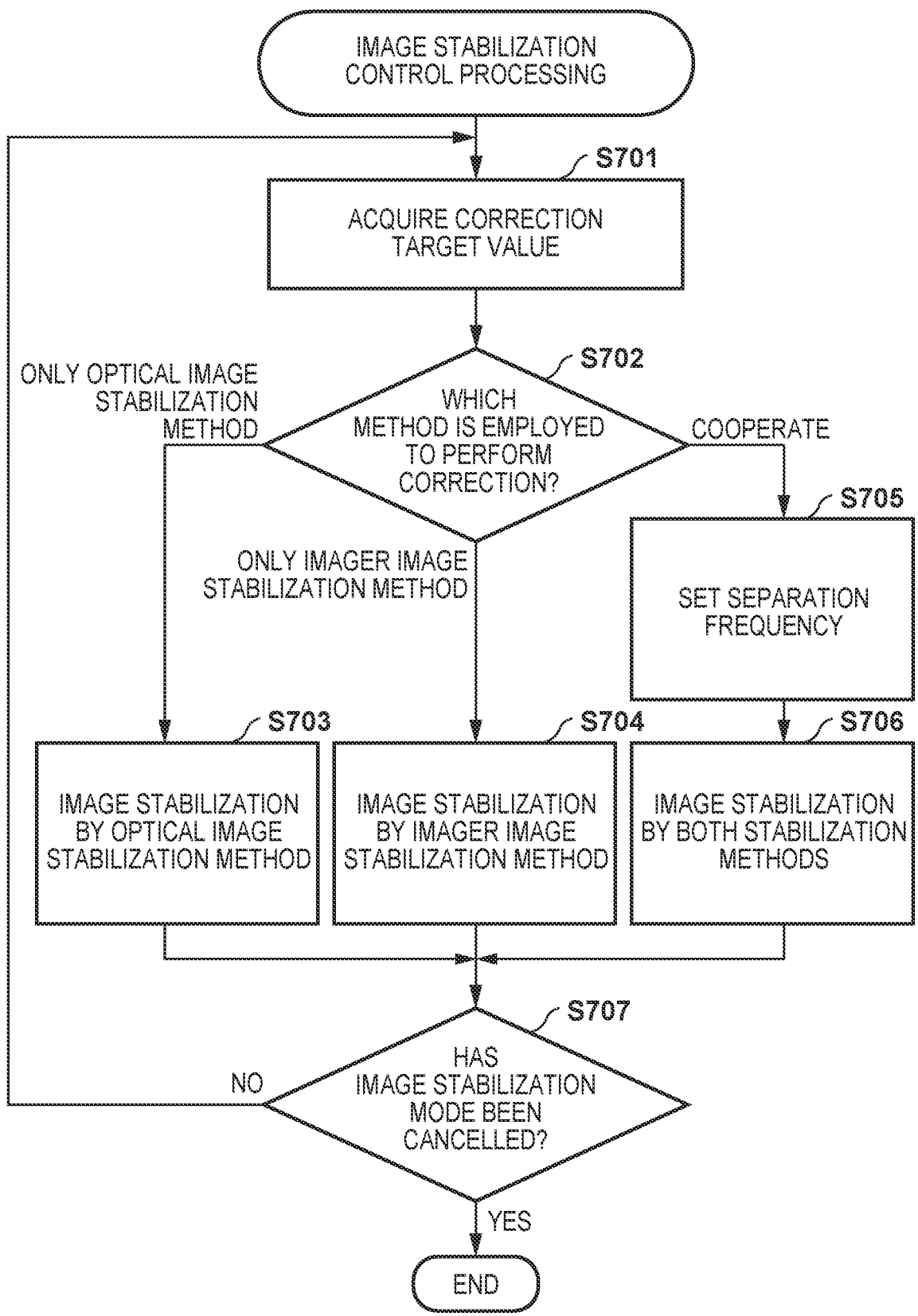
FIG. 7 is a flowchart illustrating image stabilization control processing that is executed in an image capturing system according to a first embodiment of the present invention.

The following specifically describes image stabilization control processing performed by the image capturing system with such a configuration according to the present embodiment with reference to the flowchart shown in FIG. 7. Processing according to the flowchart is realized by the camera control unit 133 reading a process program corresponding to the processing, stored in the storage unit 129, for example, loading the program to a memory (not shown), and executing the program. The image stabilization control processing in the following description is started when the camera body 120, which has been set to an image stabilization mode, performs through-the-lens display or moving image shooting, for example.

In step S701, the correction target value generation unit 203 of the camera control unit 133 acquires information regarding shake of the camera body 120 (a shake signal) from the camera shake detection unit 132. Also, the correction target value generation unit 203 processes the shake signal thus acquired to derive a correction target value.

In step S702, the cooperation control computation unit 204 of the camera control unit 133 acquires information regarding the focal length related to image capturing. Then, based on the focal length, the cooperation control computation unit 204 determines how correction related to the correction target value derived in step S701 is to be assigned to the image stabilization unit 105 and the imager image stabilization unit 124. That is, in this step, the cooperation control computation unit 204 compares the focal length related to image capturing with the first threshold value and the second threshold value, and determines whether one of the optical image stabilization method and the imager image stabilization method is to be employed to perform correction, or both of them are to be employed to perform correction. Upon determining that correction related to the correction target value is to be assigned to only the image stabilization unit 105, the cooperation control computation unit 204 moves processing to step S703, and upon determining that correction is to be assigned to only the imager image stabilization unit 124, the cooperation control computation unit 204 moves processing to step S704. Upon determining that correction related to the correction target value is to be assigned to both the image stabilization unit 105 and the imager image stabilization unit 124, the cooperation control computation unit 204 moves processing to step S705.

In step S703, the cooperation control computation unit 204 calculates the amount of correction that is to be performed by the image stabilization unit 105, based on the correction target value, and transmits the amount of correction to the camera communication control unit 134 so that the camera communication control unit 134 transmits it to the lens device 100. The amount of correction transmitted to the lens device 100 is used by the optical image stabilization control unit 106 to control the driving of the image stabilization unit 105, and image stabilization according to the optical image stabilization method is performed.

On the other hand, in step S702, upon determining that correction related to the correction target value is to be assigned to only the imager image stabilization unit 124, the cooperation control computation unit 204, in step S704, derives the amount of correction that is to be performed by the imager image stabilization unit 124, based on the correction target value. Then, the cooperation control computation unit 204 transmits the amount of correction thus derived, to the imager image stabilization control unit 125. Thus, the amount of correction is used by the imager image stabilization control unit 125 to control the driving of the imager image stabilization unit 124, and image stabilization according to the imager image stabilization method is performed.

In step S702, upon determining that correction related to the correction target value is to be assigned to both the image stabilization unit 105 and the imager image stabilization unit 124, the cooperation control computation unit 204, in step S705, first sets the separation frequency related to separation of the amount of correction. More specifically, the cooperation control computation unit 204 determines the separation frequency with reference to information regarding the separation frequency that has been determined in advance for the focal length related to image capturing.

In step S706, the cooperation control computation unit 204 separates the correction amount derived based on the correction target value, into correction amounts in two frequency bands according to the set separation frequency. Then, the cooperation control computation unit 204 transmits the correction amounts thus separated, to the optical image stabilization control unit 106 and the imager image stabilization control unit 125, respectively. Here, the transmission to the optical image stabilization control unit 106 is performed via the camera communication control unit 134 as in step S703. Thus, the image stabilization unit 105 (the optical image stabilization control unit 106) and the imager image stabilization unit 124 (the imager image stabilization control unit 125) are controlled to drive, and image stabilization according to the optical image stabilization method and the imager image stabilization method can be realized.

In step S707, the camera control unit 133 determines whether or not the image stabilization mode has been cancelled. Upon determining that the image stabilization mode has been cancelled, the camera control unit 133 ends the image stabilization control processing. Upon determining that the image stabilization mode has not been cancelled, the camera control unit 133 returns processing to step S701, and repeats the same processing on the next frame (or the frame for which the focal length determination is to be performed).

As described above, with the image stabilization control apparatus according to the present embodiment, it is possible to realize favorable image stabilization performance in an image capturing system that performs image stabilization using functions according to different stabilization methods respectively provided in a plurality of devices that are connected so as to be able to communicate with each other. More specifically, with the image stabilization control apparatus according to the present embodiment, consideration is given to characteristics, corresponding to the focal length, of each of the correction functions according to the optical image stabilization method and the imager image stabilization method, and thus it is possible to reduce the influence of a phase difference that occurs when these methods are employed so as to cooperate with each other.

Second Embodiment

In the first embodiment above, for the sake of simplification, image capturing settings such as the shutter speed are invariable. However, the present invention is not necessarily implemented in such a way, and control related to image stabilization may also be changed according to the shutter speed. Note that the configuration of the image capturing system according to the present embodiment is the same as the image capturing system shown in the first embodiment, and a description thereof is omitted.

Correction Allocation Control

First, correction allocation control according to the present embodiment will be described. For example, if an image is captured under low-light intensity conditions or the like, the shutter speed is low and the exposure time is long. Therefore, accumulated shake is likely to occur during exposure. Accumulated shake is prominent in a captured image when the amount of shake is large and the frequency of shake is high. In other words, if the exposure time is long, the position at which an optical image of the subject is formed on the image sensor may change due to shake during exposure. As a result, the subject image is already blurred in the captured image signal. Therefore, under conditions where the shutter speed is low, a large number of stops in image stabilization are required to perform image stabilization, compared to under light intensity conditions where a sufficient amount of light can be secured. Therefore, as shown in the first embodiment, if image stabilization is performed using the components corresponding to only one of the image stabilization methods, there is the possibility of the number of stops in image stabilization being insufficient and a correction remainder occurring.

Figure 8:
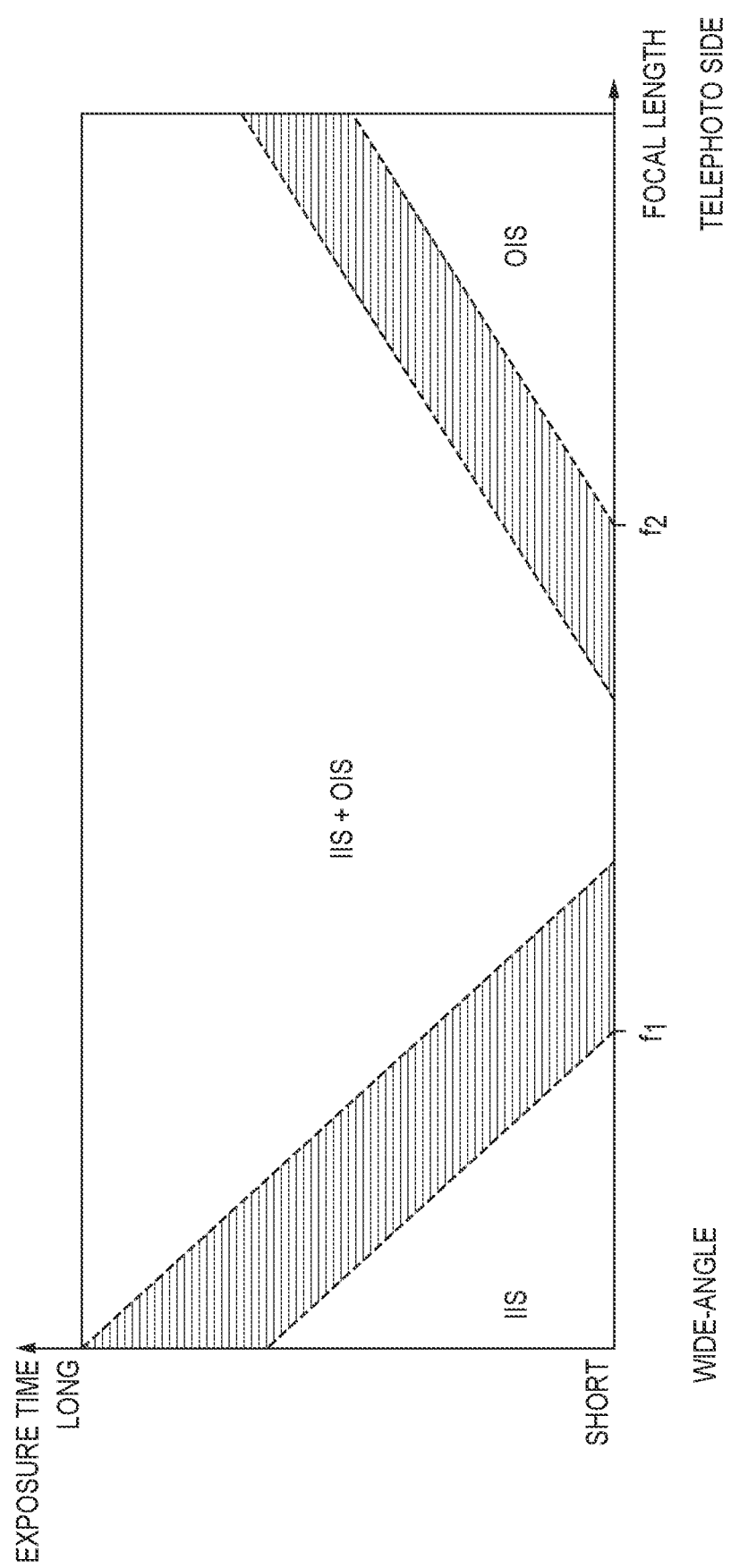
FIG. 8 is a diagram illustrating a correction allocation control in an image capturing system according to a second embodiment of the present invention.

Therefore, in the image capturing system according to the present embodiment, the allocation to each image stabilization method is changed according to the focal length and the shutter speed related to image capturing so that favorable image stabilization can be performed according to image capturing conditions. More specifically, as shown in FIG. 8, under a condition where the focal length is on the wide-angle side relative to the first threshold value f1, if the exposure time is short (the shutter speed is high), allocation is performed so that image stabilization is performed only through the imager image stabilization method. However, the number of stops in image stabilization required for favorable image stabilization increases as the exposure time increases (the shutter speed decreases). Therefore, the first threshold value is shifted toward the telephoto side in inverse proportion to the exposure time, and allocation is performed so that image stabilization is performed through the optical image stabilization method as well. Under a condition where the focal length is on the telephoto side relative to the second threshold value f2, if the exposure time is short, assignment is performed so that image stabilization is performed only through the optical image stabilization method. However, again, the number of stops in image stabilization required for favorable image stabilization increases as the exposure time increases. Therefore, the first threshold value is shifted toward the wide-angle side in proportion to the exposure time so that image stabilization is performed by employing the imager image stabilization method as well. Note that, in the hatched areas in FIG. 8, the separation frequency is adjusted stepwise so as to prevent switching between the image stabilization methods from abruptly occurring near the threshold values, as in the first embodiment.

Image Stabilization Control Processing

The following specifically describes image stabilization control processing performed by the image capturing system according to the present embodiment with reference to the flowchart shown in FIG. 9. Processing according to the flowchart is realized by the camera control unit 133 reading a process program corresponding to the processing, stored in the storage unit 129, for example, loading the program to a memory (not shown), and executing the program. The image stabilization control processing in the following description is started when the camera body 120, which has been set to an image stabilization mode, performs through-the-lens display or moving image shooting, for example. Note that in image stabilization control processing according to the present embodiment, steps in which the same processing as in image stabilization control processing according to the first embodiment are assigned the same reference numerals and descriptions thereof are omitted.

After the correction target value has been derived in step S701, the cooperation control computation unit 204, in step S901, acquires information regarding the focal length and the shutter speed related to image capturing. Then, based on the focal length and the shutter speed thus acquired, the cooperation control computation unit 204 determines how correction related to the derived correction target value is to be assigned to the image stabilization unit 105 and the imager image stabilization unit 124. Unlike in the first embodiment, the determination in this step is performed by comparing the first threshold value and the second threshold value determined according to the shutter speed with the focal length related to image capturing. That is, the determination is performed by determining which area in FIG. 8 a point indicating the relationship between the shutter speed and the focal length is present. Upon determining that correction related to the correction target value is to be assigned to only the image stabilization unit 105, the cooperation control computation unit 204 moves processing to step S703, and upon determining that correction is to be assigned to only the imager image stabilization unit 124, the cooperation control computation unit 204 moves processing to step S704. Upon determining that correction related to the correction target value is to be assigned to both the image stabilization unit 105 and the imager image stabilization unit 124, the cooperation control computation unit 204 moves processing to step S705.

As a result, the system according to the present embodiment is capable of reducing the influence of a phase difference that occurs when the image stabilization functions according to the optical image stabilization method and the imager image stabilization method are caused to cooperate with each other, while supporting image capturing conditions under which the number of stops in image stabilization is to be increased. In the present embodiment, the first threshold value and the second threshold value are changed according to the shutter speed. However, a third threshold value of the shutter speed, which is changed according to the focal length, may be defined, and the cooperation may be performed when the shutter speed is lower than the third threshold value.

Third Embodiment

In the first and second embodiments above, the assignment of the correction task to the image stabilization function according to the optical image stabilization method and the image stabilization function according to the imager image stabilization method is determined based on image capturing conditions such as the focal length and the shutter speed. However, the present invention is not necessarily implemented in such a way. That is, a phase difference that occurs when these image stabilization functions are caused to cooperate each other basically results from inter-device communication between the lens device 100 and the camera body 120 as described above. Therefore, what is to be considered is not necessarily an image capturing condition, and allocation may be performed directly considering a communication state.

For example, a phase difference between correction according to the optical image stabilization method and correction according to the imager image stabilization method resulting from a communication delay or down sampling may be detected or derived, and the cooperation control computation unit 204 may further change the assignment of correction based on the phase difference. In this case, as a result of the image stabilization functions according to the two image stabilization methods being caused to cooperate with each other, correction accuracy may degrade due to the phase difference. Therefore, control may be performed if the phase difference is greater than a fourth threshold value, to expand the range of an image capturing condition corresponding to the case in which only a device that performs processing related to assignment performs correction. In other words, control may be performed to reduce the range of an image capturing condition corresponding to the case in which the image stabilization functions according to the two image stabilization methods are caused to cooperate with each other.

In the example shown in FIG. 2, the camera control unit 133 performs assignment of correction. Therefore, when a phase difference is greater than the fourth threshold value, the cooperation control computation unit 204 may expand the range of the image capturing conditions in which correction is performed by employing only the image stabilization function according to the imager image stabilization method. That is, the cooperation control computation unit 204 may perform control to shift the first threshold value toward the telephoto side so that image stabilization is likely to be performed only through the imager image stabilization method when the focal length is on the wide-angle side.

In contrast, in a mode where the lens control unit 110 performs assignment of correction, when a phase difference is greater than the fourth threshold value, the cooperation control computation unit 204 of the lens control unit 110 may expand the range of the image capturing conditions in which correction is performed by employing only the image stabilization function according to the optical image stabilization method. That is, the cooperation control computation unit 204 may perform control to shift the second threshold value toward the wide-angle side so that image stabilization is likely to be performed only through the optical image stabilization method when the focal length is on the telephoto side.

In the present description, considering the influence of a communication delay, the range of an image capturing condition corresponding to the case in which correction is performed only through the image stabilization method employed by a device that performs assignment of correction is expanded. However, degradation in image quality resulting from a phase difference may be ignored if image stabilization methods are not performed by a plurality of devices so as to cooperate with each other. Therefore, even when the phase difference is greater than the fourth threshold value, it is possible to expand the range of the image capturing condition corresponding to the case in which correction is performed only through the image stabilization method employed by a device that does not perform assignment of correction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-003722, filed Jan. 12, 2018, which is hereby incorporated by reference herein in its entirety.

What is claimed is:

1. An image stabilization control apparatus that causes a first correction unit included in a first device and a second correction unit included in a second device that is configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the image stabilization control apparatus comprising:
a processor; and
a memory including instructions that, when executed by the processor, cause the processor to function as:
an acquisition unit configured to acquire information regarding the shake, a focal length related to the image capturing and a shutter speed related to the image capturing; and
a control unit configured to assign a correction task, which is the task of performing correction regarding the influence of shake, to the first correction unit and the second correction unit, based on the information regarding the focal length acquired by the acquisition unit,
wherein the control unit assigns the correction task to only one of the first correction unit and the second correction unit when the focal length satisfies a predetermined condition, and assigns the correction task to both the first correction unit and the second correction unit when the shutter speed is lower than a third threshold value.

2. The image stabilization control apparatus according to claim 1, wherein when correction is to be assigned to only one of the first correction unit and the second correction unit, the control unit changes the correction unit to which correction is to be assigned, based on whether the focal length is on the telephoto side or on the wide-angle side.

3. The image stabilization control apparatus according to claim 2,
wherein the image stabilization method employed by the first correction unit is for correcting the influence of shake by controlling operations of an image optical system to move a position at which an optical image is formed on an image sensor, and
the control unit assigns the correction task to only the first correction unit when the focal length is on the telephoto side relative to a first threshold value.

4. The image stabilization control apparatus according to claim 3,
wherein the image stabilization method employed by the second correction unit is for correcting the influence of shake by changing at least one of the position and the posture of the image sensor to move a position at which an optical image is formed on the image sensor, and
the control unit assigns the correction task to only the second correction unit when the focal length is on the wide-angle side relative to a second threshold value.

5. The image stabilization control apparatus according to claim 2,
wherein the image stabilization method employed by the first correction unit is for correcting the influence of shake by changing at least one of the position and the posture of an image sensor to move a position at which an optical image is formed on the image sensor, and
the control unit assigns the correction task to only the first correction unit when the focal length is on the wide-angle side relative to a second threshold value.

6. The image stabilization control apparatus according to claim 5,
wherein the image stabilization method employed by the second correction unit is for correcting the influence of shake by controlling operations of an image optical system to move a position at which an optical image is formed on the image sensor, and
the control unit assigns the correction task to only the second correction unit when the focal length is on the telephoto side relative to a first threshold value.

7. The image stabilization control apparatus according to claim 1, wherein the third threshold value is changed according to the focal length.

8. The image stabilization control apparatus according to claim 1,
wherein the image stabilization control apparatus is provided in the first device, and
wherein the memory further including instructions that, when executed by the processor, cause the processor to function as a communication control unit configured to control transmit, to the second device, information regarding the shake for which the correction task is to be assigned to the second correction unit.

9. The image stabilization control apparatus according to claim 8,
wherein the control unit changes a condition for assigning the correction task to only the first correction unit, a condition for assigning the correction task to only the second correction unit, and a condition for assigning the correction task to both the first correction unit and the second correction unit, according to the state of communication performed by the communication unit.

10. The image stabilization control apparatus according to claim 8,
wherein the memory further including instructions that, when executed by the processor, cause the processor to function as a determination unit configured to separate the shake into components in predetermined frequency bands, and determine whether or not a phase difference between correction that is to be performed by the first correction unit on a component of the shake in a first frequency band and correction that is to be performed by the second correction unit, via information transmission performed by the communication unit, on a component of the shake in a second frequency band that is different from the first frequency band is greater than a fourth threshold value, wherein, upon the determination unit determining that the phase difference is greater than the fourth threshold value, the control unit expands the range of the focal length corresponding to the case in which correction is to be assigned to only the first correction unit.

11. An image capturing system that causes a first correction unit included in a first device and a second correction unit included in a second device and connected to the first device, to cooperate with each other so as to correct, when image capturing is performed, an influence of shake of the first device and the second device on image capturing, the second correction unit employing an image stabilization method that is different from an image stabilization method employed by the first correction unit, the first device comprising:
  a processor; and
  a memory including instructions that, when executed by the processor, cause the processor to function as:
    a detection unit configured to detect shake of the first device when the image capturing is performed;
    an acquisition unit configured to acquire information regarding a focal length related to the image capturing and a shutter speed related to the image capturing;
    the first correction unit;
    a control unit configured to assign a correction task, which is the task of performing correction regarding the influence of shake, to the first correction unit and the second correction unit, based on the information regarding the focal length acquired by the acquisition unit; and
    a transmitting unit configured to transmit, to the second device, information regarding the shake for which the correction task is to be assigned to the second correction unit, the second device comprising:
  a processor; and
  a memory including instructions that, when executed by the processor, cause the processor to function as:
    a receiving unit configured to receive information transmitted by the transmitting unit; and
    the second correction unit, and wherein the control unit assigns the correction task to only one of the first correction unit and the second correction unit when the focal length satisfies a predetermined condition, and the control unit assigns the correction task to both the first correction unit and the second correction unit when the shutter speed is lower than a third threshold value.

12. A method for controlling an image stabilization control apparatus that causes a first correction unit included in a first device and a second correction unit included in a second device that is configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the method comprising:

an acquisition step of acquiring information regarding the shake, a focal length related to the image capturing and a shutter speed related to the image capturing; and a control step of assigning the correction task, to the first correction unit and the second correction unit, based on the information regarding the focal length acquired in the acquisition step, wherein, in the control step, correction is assigned to only one of the first correction unit and the second correction unit when the focal length satisfies a predetermined condition, and is assigned to both the first correction unit and the second correction unit when the shutter speed is lower than a third threshold value.

13. A non-transitory computer-readable recording medium having recorded thereon a program for a computer that causes a first correction unit included in a first device and a second correction unit included in a second device configured to be able to communicate with the first device, to cooperate with each other so as to correct, when image capturing is performed, an influence of shake of the first device and the second device on image capturing, the second correction unit employing an image stabilization method that is different from an image stabilization method employed by the first correction unit, the program causing the computer to execute:

processing to acquire information regarding the shake, a focal length related to the image capturing and a shutter speed related to the image capturing; and processing to assign a correction task, which is the task of performing correction regarding the influence of shake, to the first correction unit and the second correction unit, based on the information regarding the focal length acquired in the processing executed to acquire the information, wherein, in the processing executed to perform control, the correction task is assigned to only one of the first correction unit and the second correction unit when the focal length satisfies a predetermined condition and is assigned to both the first correction unit and the second correction unit when the shutter speed is lower than a third threshold value.

* * * * *